United States Patent [19]
Yokogawa et al.

[11] Patent Number: 6,154,595
[45] Date of Patent: Nov. 28, 2000

[54] SIDE-FACE ILLUMINATING OPTICAL FIBER

[75] Inventors: Hiroshi Yokogawa, Hirakata; Masaru Yokoyama, Yao; Kenji Tsubaki, Katano; Kenji Sonoda; Keishi Kousaka, both of Shijonawate; Mikio Sei, Neyagawa; Nobuaki Yabunouchi, Katano, all of Japan

[73] Assignee: Matsushita Electric Works, Ltd., Osaka-fu, Japan

[21] Appl. No.: 09/113,507

[22] Filed: Jul. 10, 1998

[30] Foreign Application Priority Data

Jul. 14, 1997 [JP] Japan ..................................... 9-188149

[51] Int. Cl.[7] ...................................................... G02B 6/22
[52] U.S. Cl. .......................... 385/127; 362/558; 362/582; 385/31; 385/125; 385/144
[58] Field of Search ............................. 385/31, 123, 125, 385/127, 141, 144, 147, 901; 362/31, 551, 558–560, 582

[56] References Cited

U.S. PATENT DOCUMENTS

| | | | |
|---|---|---|---|
| 4,402,827 | 9/1983 | Joseph | 210/314 |
| 4,422,719 | 12/1983 | Orcutt | 385/123 |
| 4,432,956 | 2/1984 | Zarzycki et al. | 423/338 |
| 4,610,863 | 9/1986 | Tewari et al. | 423/338 |
| 5,027,259 | 6/1991 | Chujko | 362/582 |
| 5,124,364 | 6/1992 | Wolff et al. | 521/55 |
| 5,137,297 | 8/1992 | Walker | 280/414.5 |
| 5,416,608 | 5/1995 | Ueda et al. | 358/474 |
| 5,432,876 | 7/1995 | Appeldorn et al. | 385/31 |
| 5,536,265 | 7/1996 | van den Bergh et al. | 606/2 |
| 5,542,017 | 7/1996 | Koike | 385/123 |
| 5,579,429 | 11/1996 | Naum | 385/127 X |
| 5,584,556 | 12/1996 | Yokoyama et al. | 362/31 |
| 5,684,907 | 11/1997 | Sprehn et al. | 385/123 |
| 5,737,472 | 4/1998 | Bernasson et al. | 385/123 |
| 5,790,742 | 8/1998 | Tsubaki et al. | 385/144 |
| 5,845,038 | 12/1998 | Lundin et al. | 385/901 |
| 5,901,267 | 5/1999 | Lee | 385/901 |

FOREIGN PATENT DOCUMENTS

| | | |
|---|---|---|
| 0779523 | 6/1997 | European Pat. Off. . |
| 0800036 | 10/1997 | European Pat. Off. . |
| 5-279011 | 10/1993 | Japan . |
| 7-138375 | 5/1995 | Japan . |

OTHER PUBLICATIONS

Copy of an English Language Abstract of JP No. 5–279011. (Oct. 1993).

Copy of an English Language Abstract of JP No. 7–138375. (May 1995).

Hrubesh L W et al., "Thin aerogel films for optical, thermal, acoustic and electronic applications", Journal of Non–Crystalline Solids, vol. 188, No. 1–2, Jul. 1995, pp. 46–53.

*Primary Examiner*—John D. Lee
*Attorney, Agent, or Firm*—Greenblum & Bernstein P.L.C.

[57] ABSTRACT

A side-face illuminating optical fiber comprising a core 1 transmitting therethrough light entering from an incident end of the optical fiber, a cladding 2 made of silica aerogel which covers an outer peripheral surface of the core, a transparent coating layer 3 which covers an outer periphery of the cladding, and an illuminating portion formed at least in a part of an interface between the core and the cladding. The light transmitting though said core radiates through the illuminating portion to the cladding.

20 Claims, 8 Drawing Sheets

SIDE-FACE ILLUMINATING OPTICAL FIBER

This application is based on patent application No. HEI9-188149 filed in Japan, the content of which is incorporated hereinto by reference.

BACKGROUND OF THE INVENTION

1. Field of the Invention

The present invention relates to a side-face illuminating optical fiber utilizing an optical fiber formed of a core and a cladding, and in particular, to a side-face illuminating optical fiber which can be used for solar light transmission, illumination for automobile components, illumination at places equipped with a water supply at washstands, kitchens and bathrooms, illumination at handrails, corridors, stairs and the like in a senior-friendly house, and a light guide using illumination cutting off infrared-rays or ultraviolet-rays at art galleries and museums.

2. Description of the Related Art

A glass fiber has a core and a cladding that covers the core. Conventionally, as a material for a core of an optical fiber, there have been used a glass such as quartz glass or multi-component glass, an acryl or styrol-based plastics such as methylmethacrylate and a transparent liquid such as tetrachloroethylene. For the cladding, there have been used soda lime glasses and boro-silicate glasses with a refractive index lower than that of the core, and fluoro resins such as tetra-fluoro ethylene/polyfluoro vinylidene copolymer.

Some parties have attempted to utilize an optical fiber for illumination or the like by illuminating with light from its side face. Such an optical fiber is hereinafter referred to as side-face illuminating optical fiber. Light transmitted through the core is allowed to be scattered through the interface between the core and the cladding and to illuminate with the scattered light from the side face of the optical fiber.

However, the optical fiber has a limitation in the quantity of light to be condensed, and therefore, the quantity of light of the illumination from the side face is insufficient, as will be explain below. Therefore, the side-face illuminating optical fiber is still far from becoming part of the mainstream of illumination.

In the optical fiber, the refractive index of the cladding is lower than that of the core. The acceptance angle of the optical fiber and the total reflection angle at the interface between the core and the cladding vary with difference in refractive index between the core and the cladding. In general, the relative index difference expressed by the following equation is used to represent the difference in refractive index between the core and the cladding.

Relative index difference=$(n_1-n_2)/n_1$, where $n_1$ represents the refractive index of the core and $n_2$ represents that of the cladding.

The numerical aperture and the acceptance angle θ (see FIG. 1) of the optical fiber are expressed by the following equation.

Figure 1:
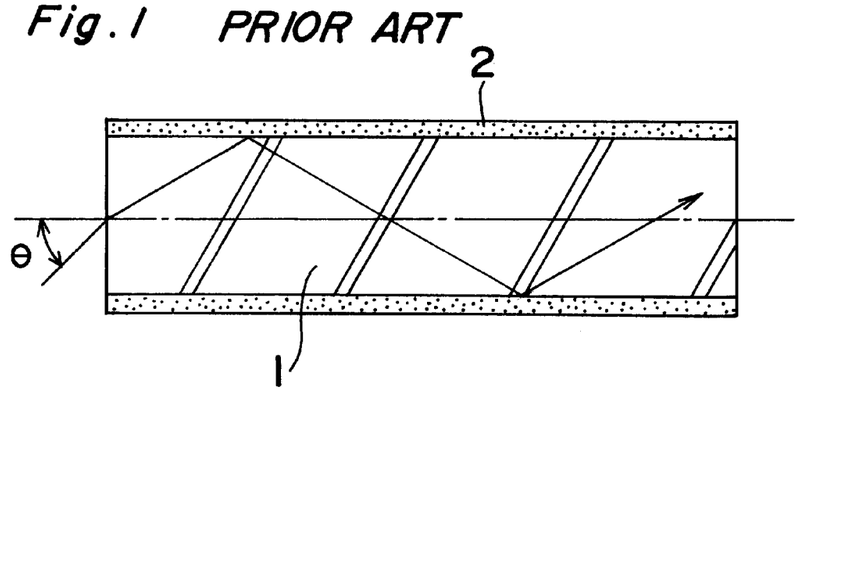
FIG. 1 is a sectional view showing an optical fiber acceptance angle $\theta$.

Numerical aperture=$n \cdot \sin \theta = (n_1^2 - n_2^2)^{1/2}$, where n represents the refractive index at the outside of the optical fiber and n of air is normally 1.0.

As is observed in these equations, the acceptance angle θ of the optical fiber increases with increase in the difference in refractive index between the core and the cladding. That is, the greater the relative index difference is, the greater the angle is. In order to condense and transmit a larger quantity of light, it is required to increase the relative index difference or to the increase the acceptance angle θ of the optical fiber. This can be achieved by increasing the refractive index of the core and by reducing that of the cladding.

In the optical fiber, pure quartz glass, which has a small optical loss, excellent heat resistance and chemical resistance, is often used as the core. However, the quartz glass has a low refractive index of 1.46, it is a problem to select a cladding having a lower refractive index. Therefore, when glass is used for the cladding, a component such as $B_2O_3$, fluorine or the like is added to reduce refractive index in order to reduce a refractive index from that of pure quartz glass. In order to increase the refractive index while maintaining low optical loss, a dopant to increase refractive index may be added quartz glass. As such a dopant, there can be enumerated $TiO_2$, $Ta_2O_5$, $SnO_2$, $Nb_2O_5$, $ZrO_2$, $Yb_2O_3$, $La_2O_3$ and $Al_2O_3$. In this case, pure quartz glass or doped quartz glass having a lower refractive index can be used as the cladding. When using a plastics material as the cladding, there is employed silicon resin such as polysiloxane or silicone rubber, fluorine containing resin such as fluorinated ethylene propylene or polyvinylidene fluoride, but these materials have a low refractive index of about 1.29 to 1.33.

As stated above, the acceptance angle θ of the optical fiber varies with the relative index difference between the core and the cladding. For example, with regard to the light guide, if flint F2 glass (having refractive index of 1.62) is used for the core and soda-lime glass (having refractive index of 1.52) is used for the cladding, then the numerical aperture becomes 0.56 and the acceptance angle θ becomes 34°. With regard to the plastics optical fiber, if methacrylic resin (having refractive index of 1.49) is used for the core and fluororesin (having refractive index of 1.39) is used for the cladding, then the numerical aperture becomes 0.54 and the acceptance angle θ becomes 32°. As described above, in the case where an optical fiber is manufactured with the use of the conventional core and cladding, the acceptance angle θ is about 30 to 50° and it is difficult to manufacture an optical fiber that can gather and transmit a large quantity of light.

To sum up, the conventional optical fiber has condensed a small quantity of light, and therefore, the quantity of light radiated from the side face of the optical fiber has been insufficient.

SUMMARY OF THE INVENTION

An object of the present invention is therefore to provide a side-face illuminating optical fiber, which condenses large quantity of light and illuminates with large quantity of light from its side face.

In order to achieve the aforementioned object, according to one aspect of the present invention, there is provided a side-face illuminating optical fiber comprising, a core transmitting therethrough light entering from an incident end of the optical fiber a cladding made of silica aerogel which covers an outer peripheral surface of the core, a transparent coating layer which covers an outer periphery of the cladding, and a illuminating portion formed at least in a part of an interface between the core and the cladding, wherein the light transmitting though the core radiates through the illuminating portion to the cladding.

Preferably, the illuminating portion further comprises an uneven interface that scatters the light transmitting through the core.

Preferably, the uneven interface is formed by pressing particles of the cladding against the core.

It is also preferred that the cladding consists of particles, and the coating layer is a layer, which presses the cladding against the core.

Advantageously, the coating layer is a heat shrinkage tube, which presses the cladding to the core by thermal contraction.

It is also preferred that the coating layer is a tape having one surface to which the silica aerogel for the coating layer is stuck and the tape is wound an outer periphery of the core wherein the surface to which the silica aerogel is stuck contacts the core.

In another aspect of the present invention, a layer which reflects light is provided between the core and the cladding, between the cladding and the coating layer or on an outer periphery of the coating layer so as to shield the light radiating through the illuminating portion.

Advantageously, the silica aerogel of the cladding is obtained by making a gel of a solution containing silicate ester hydrophobic and by subjecting the obtained hydrophobic gel to a supercritical drying process.

The side-face illuminating optical fiber may have at least two of the illuminating portions. In this case, it is preferred that the illuminating portions is arranged in a direction of a longitudinal axis of the optical fiber. Also, the illuminating portion may be elongated in a direction of a longitudinal axis of the optical fiber.

In this case, it is preferred that transmission ratio at a position in the illuminating portion becomes higher as the position of the illuminating portion becomes further away from the incident end. It is also preferred that each transmission ratio varies with the position so as to provide uniform quantity of light in the illuminating portion.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which.

DETAILED DESCRIPTION OF THE PREFERRED EMBODIMENTS

Referring now to the drawings wherein like reference characters designate like or corresponding parts throughout the several views, preferred embodiments of the invention are explained below.

Figure 2A:
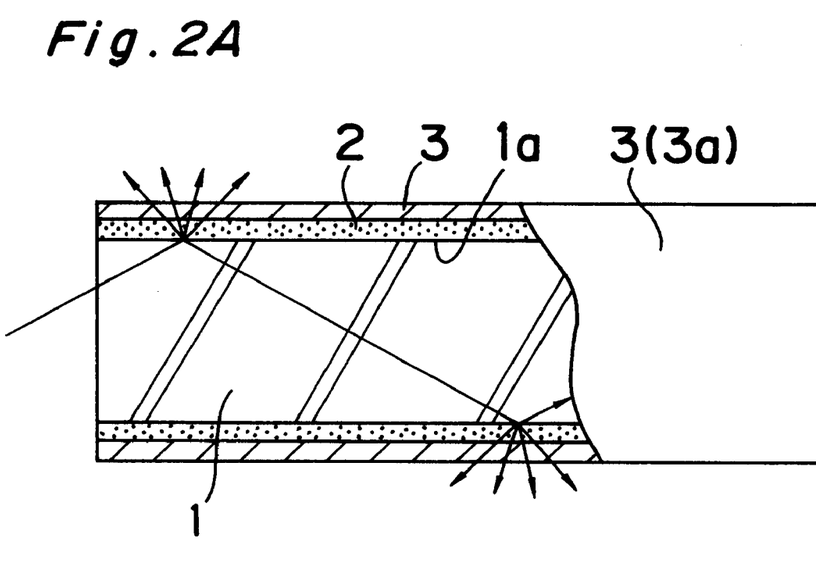
FIG. 2A is a front sectional view of an optical fiber of a first embodiment.
Figure 2B:
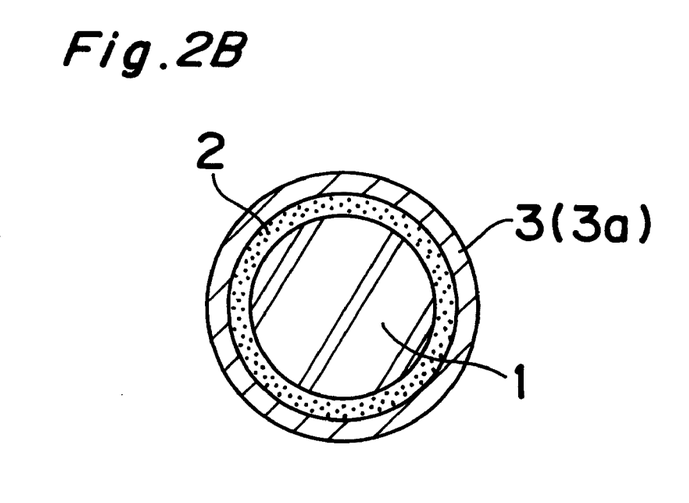
FIG. 2B is a side sectional view of the optical fiber of the first embodiment.

FIGS. 2A and 2B shows a first embodiment according to the present invention. A optical fiber of the first embodiment of the present invention is formed of a core and a cladding, and the cladding has a light refractive index lower than that of the core and covers the outer peripheral surface of the core. As the core, there can be employed, for example, acryl or styrol-based plastics of polymethylmethacrylate (PMMA) or the like or transparent liquid of tetrachloroethylene or the like.

On the other hand, the cladding of the first embodiment of the present invention is formed of silica aerogel having porous silica skeleton structure. The silica aerogel is allowed to vary its refractive index by controlling the composition of materials, and it has a low refractive index of 1.0008 to 1.18. Since the refractive index is very small as described above, the relative index difference can be remarkably increased for a variety of cores, and the acceptance angle $\theta$ can be made to be 90° at maximum when the refractive index of the cladding of the silica aerogel is 1.1. Therefore, light can be condensed in a wide range of acceptance angle, and this allows the fabrication of an optical fiber having a high light-condensing ratio and a large quantity of the condensed light at the incident end of the fiber. Furthermore, an output angle of light at the out-going end of the fiber can also be increased.

Silica aerogel can be produced by subjecting a gel compound of a solution containing a silicate including a silicate ester such as alkoxysilane and sodium silicate to a hydrophobic process and a supercritical drying process. That is, as disclosed in U.S. Pat. Nos. 4,402,827, 4,432,956, 4,610,863 and so on, a gel compound in a wet state comprised of silica skeletons is obtained by subjecting alkoxysilane (also referred to as silicon alcoxide or alkyl silicate) to hydrolysis and polymerization, and silica aerogel can be manufactured by drying the gel compound in the existence of a solvent (dispersion medium) of alcohol, carbon dioxide or the like in a supercritical state not lower than the critical point of this solvent. Furthermore, as disclosed in U.S. Pat. Nos. 5,137,297 and 5,124,364, silica aerogel can be similarly manufactured by using sodium silicate. Then, as disclosed in Japanese Patent laid open publication Nos. HEI 5-279011 and HEI 7-138375, silica aerogel can be made hydrophobic by subjecting the gel compound to a hydrophobic process. The hydrophobic process can be performed before or in the supercritical drying. The silica aerogel to which the hydrophobic property is given as described above scarcely permits the intrusion of moisture, water and the like, so that the performances of the refractive index, light transmission properties and so on are hard to be deteriorated.

In FIGS. 2A and 2B, a cladding 2 comprised of silica aerogel is provided on the outer periphery of a core 1 and a transparent coating layer 3 covers the outer periphery of the cladding 2, thus, the cladding 2 is retained on the outer periphery of the core 1. In the optical fiber shown in FIGS. 2A and 2B, a heat shrinkage tube 3a is employed as the coating layer 3. As the heat shrinkage tube 3a, anything can be employed without specific limitation so long as its size is reduced by applying heat thereto. For example, a tube of fluororesin, silicone resin, polyolefin of ethylene propylene rubber or the like can be employed.

A side-face illuminating optical fiber employing the heat shrinkage tube 3a as the coating layer 3 can be manufactured by arranging the heat shrinkage tube 3a on the outer periphery of the core 1, inserting and filling particulate silica aerogel in a gap between the core 1 and the heat shrinkage tube 3a and thereafter shrinking the heat shrinkage tube 3a by applying heat thereto. The particulate silica aerogel may be pulvers and/or grains. Then, the tube 3a fixes the cladding 2 comprised of silica aerogel to the outer periphery of the core 1. In this case, by thermally contracting the heat shrinkage tube 3a, grains of silica aerogel constituting the cladding 2 are pressed against the surface of the core 1, to deform the surface of the core 1 or to provide fine uneven interface on the surface. The uneven interface is used as an illuminating portion at an interface 1a between the core 1 and the cladding 2.

In the side-face illuminating optical fiber wherein the uneven interface is formed at the interface 1a, when light transmitting through the core 1 is incident on the interface between the core 1 and the cladding 2, the light is scattered by the uneven interface as shown in FIG. 2A. Part of the scattered light is radiated from the outer periphery of the optical fiber through the cladding 2 and the coating layer 3, thereby allowing the side face of the optical fiber to illuminate with light. The optical fiber formed with the use of silica aerogel as the cladding 2 has a great acceptance angle θ and a large light-condensing quantity, and therefore, the side-face illuminating optical fiber can illuminate with a large quantity of light from its side face. With this arrangement, the cladding 2 comprised of silica aerogel can be firmly retained on the outer periphery of the core 1 and the grains of silica aerogel constituting the cladding 2 are pressed against the surface of the core 1 by thermally contracting the heat shrinkage tube 3a, so that an uneven interface for the light illumination from the side face can be easily formed at the interface 1a.

Figure 3A:
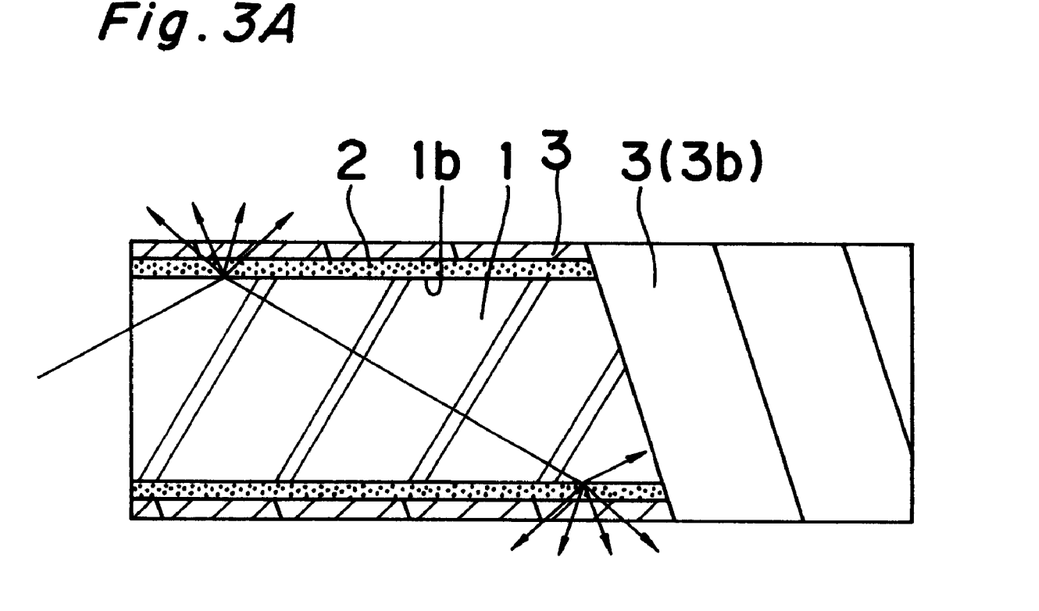
FIG. 3A is a front sectional view of an optical fiber of a second embodiment.
Figure 3B:
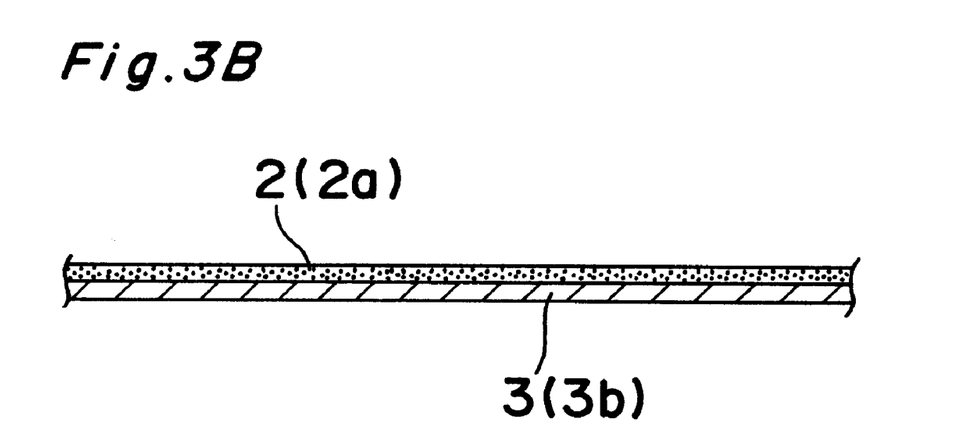
FIG. 3B is a front sectional view of a tape.

FIGS. 3A and 3B show the side-face illuminating optical fiber of a second embodiment of the present invention, wherein a tape 3b having one surface applied with an adhesive is employed as the coating layer 3. The tape 3b is not specifically limited in shape of width, thickness and so on so long as it is transparent, and it can be provided by a tape of, for example, polyethylene, crosslinked polyethylene, polyvinyl chloride, polyolefin elastomer or the like. The hydrophobic silica aerogel possibly contracts and becomes cloudy when brought in contact with an organic solvent of alcohol, acetone or the like. By taking such a solvent resistance into consideration, it is preferred that the adhesive of the tape 3b should be a solventless pressure-sensitive adhesive (also called as the self-adhesive) or a hot-melt adhesive.

When a side-face illuminating optical fiber employing the tape 3b as the coating layer 3 is manufactured, granular silica aerogel 2a is scattered on and fixed to the surface of the tape 3b coated with the adhesive as shown in FIG. 3B. Then, the tape 3b is wound so that the silica aerogel 2a comes in contact with the outer periphery of the core 1, consequently fixing and retaining the cladding 2 of silica aerogel 2a on the outer periphery of the core 1 as shown in FIG. 3A. By wrapping the tape 3b around the outer periphery of the core 1, the grains of silica aerogel 2a are pressed against the surface of the core 1, to deform of the surface of the core 1 by the granular of silica aerogel 2a to have a fine uneven interface which is used as a illuminating portion at an interface 1b.

In the side-face illuminating optical fiber wherein the uneven interface is formed at the interface 1b, when light transmitting through the core 1 is incident on the interface 1b, the light is scattered by the uneven interface as shown in FIG. 3A. Part of the scattered light is radiated from the outer periphery of the optical fiber through the cladding 2 and the coating layer 3, thereby allowing the side face of the optical fiber to illuminate with light. The optical fiber formed with the use of silica aerogel as the cladding 2 has a great acceptance angle θ and a large light-condensing quantity, and therefore, a side-face illuminating optical fiber can illuminates with large quantity of light from its side face. With this arrangement, the cladding 2 can be firmly retained on the outer periphery of the core 1 by simply winding the tape 3b around the core 1 to press the grains of silica aerogel constituting the cladding against the surface of the core 1, so that the uneven interface for the light illumination from the side face can be easily formed at the interface 1b.

In order to form the uneven interface of the interface 1a or 1b by pressing the grains of the silica aerogel against the surface of the core 1 as described above, it is preferable to use for the core 1 a material having a lower hardness than that of the silica aerogel constituting the cladding 2.

By providing the uneven interface along the whole length of the optical fiber, light can be radiated from the side face throughout the whole length of the optical fiber. If this uneven interface is provided at a portion of the optical fiber by varying a force for wrapping the tape 3b, light can be radiated from the side face only at the portion where the uneven interface is provided.

Next, FIGS. 4A to 6B show optical fibers of a third embodiment according to the present invention. The side-face illuminating optical fibers of the embodiments shown in FIGS. 2A to 3B illuminate with light from the whole periphery of the side face. However, by providing a light reflecting layer 4 to cover a portion of the outer periphery of the core 1, light is radiated from the side face only in the portion not covered with the light reflecting layer 4 providing directivity of illumination.

Figure 4A:
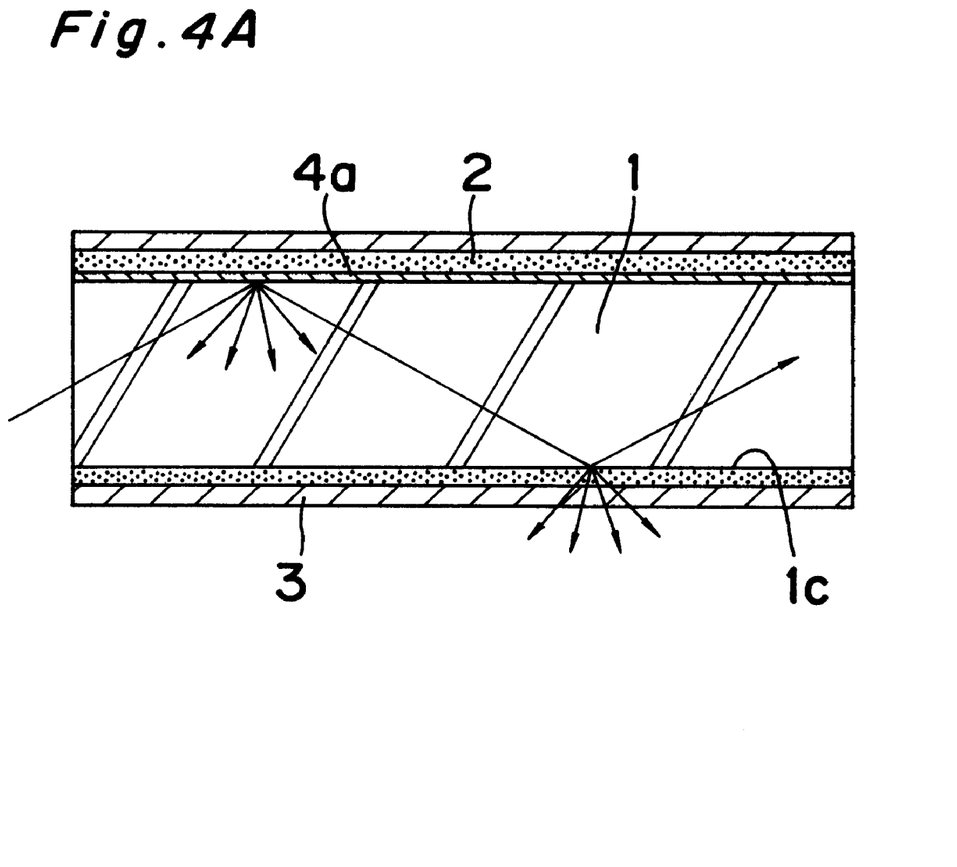
FIG. 4A is a front sectional view of an optical fiber of a third embodiment.
Figure 4B:
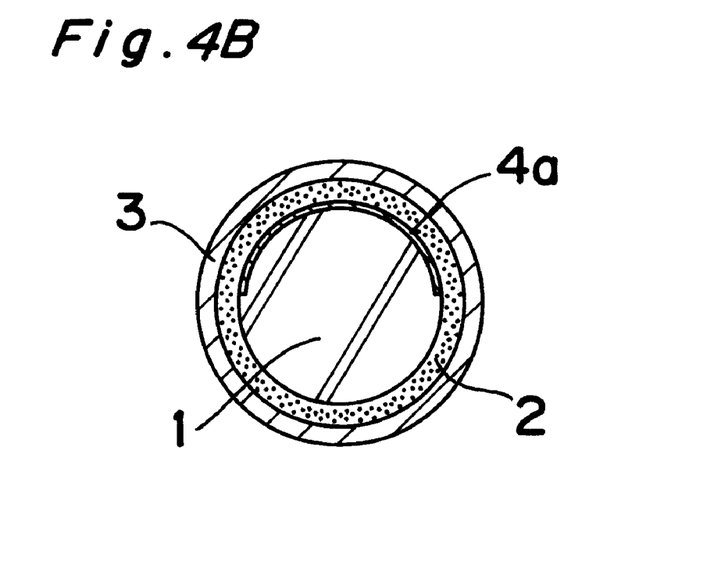
FIG. 4B is a side sectional view of the optical fiber of the third embodiment.
Figure 5A:
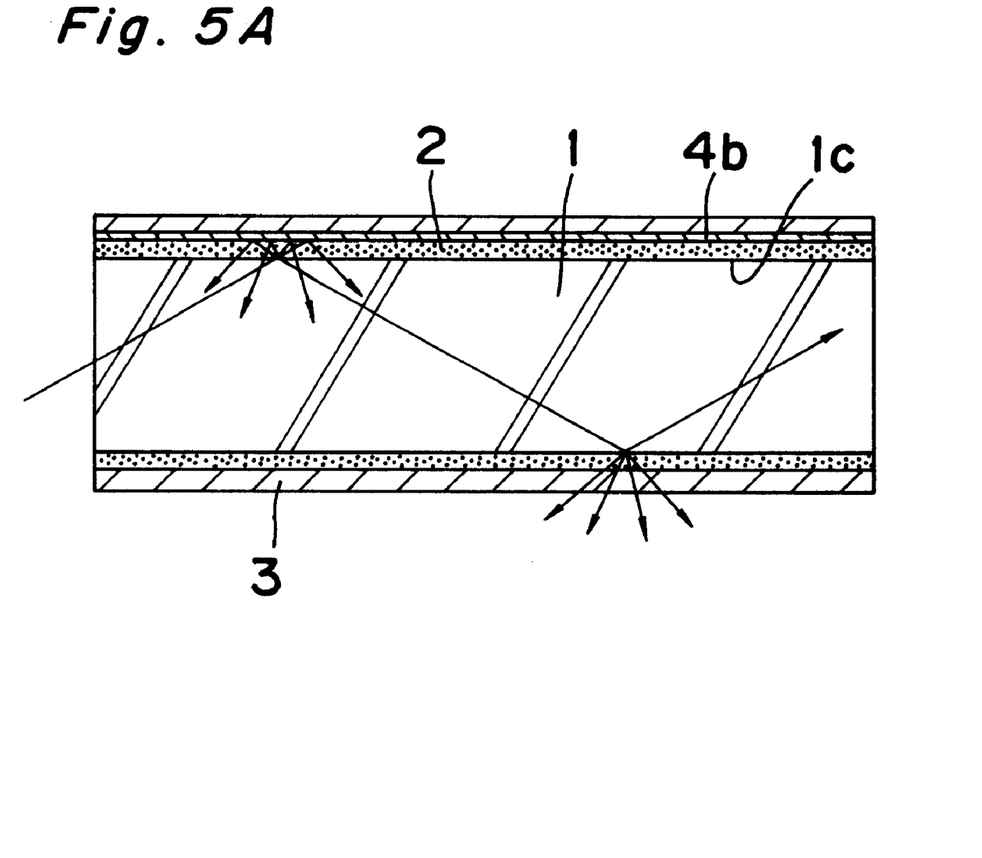
FIG. 5A is a front sectional view of another optical fiber of the third embodiment.
Figure 5B:
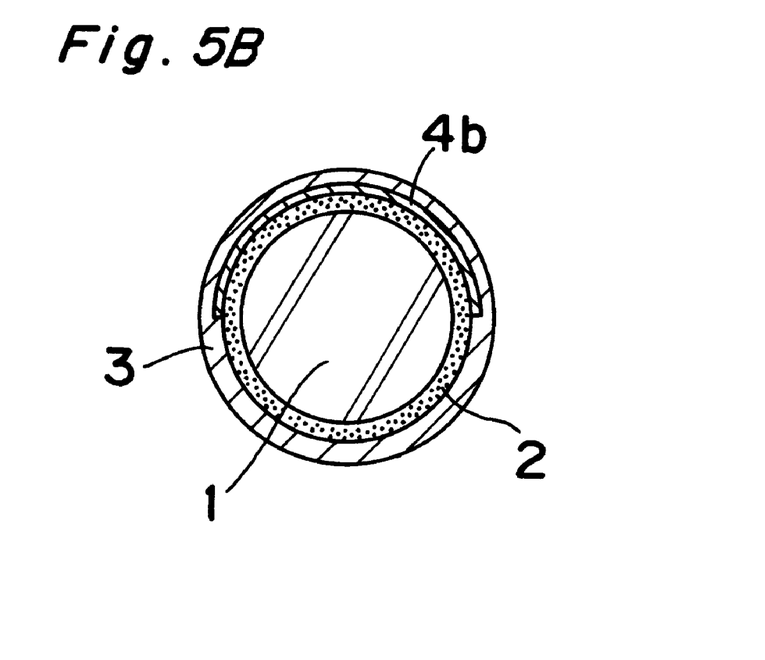
FIG. 5B is a side sectional view of the optical fiber of the third embodiment.
Figure 6A:
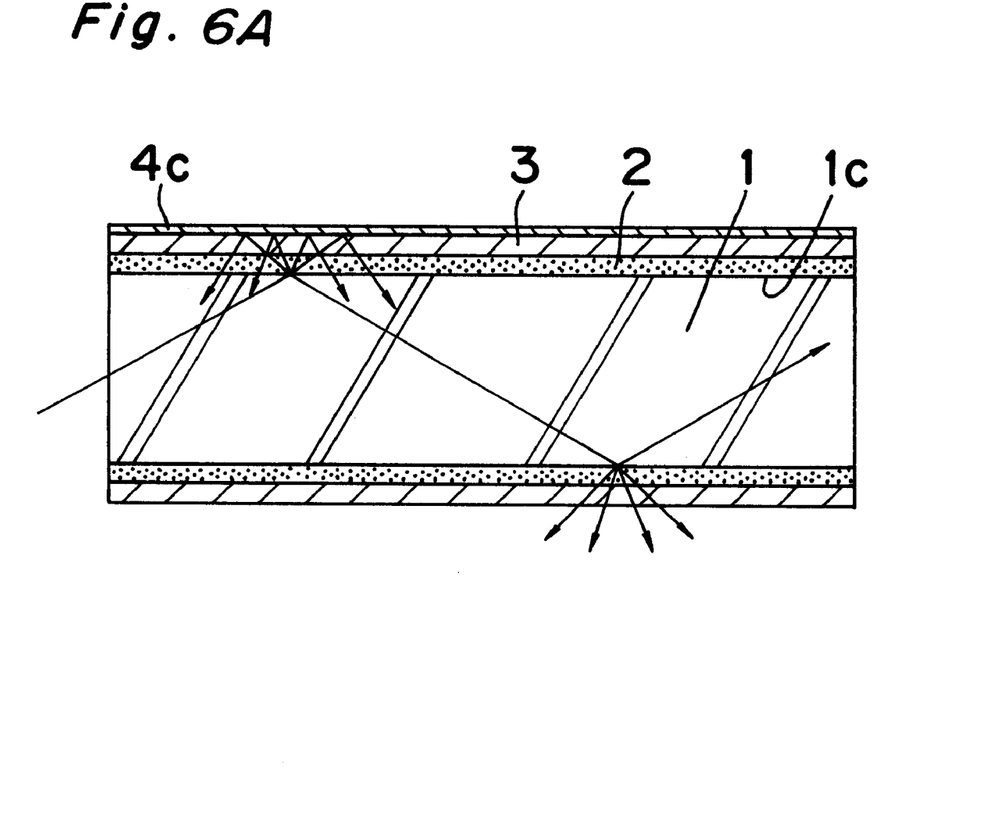
FIG. 6A is a front sectional view of still another optical fiber of the third embodiment.
Figure 6B:
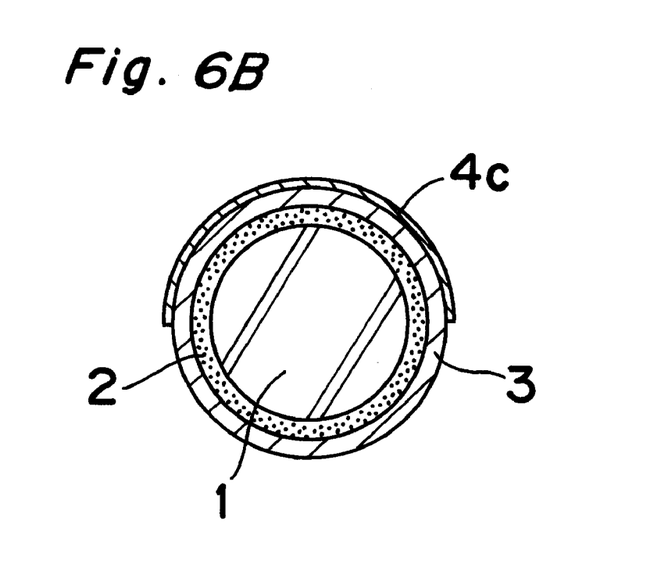
FIG. 6B is a side sectional view of the optical fiber of the third embodiment.

FIGS. 4A and 4B show an example in which the light reflecting layer 4 is provided between the core 1 and the cladding 2 by inserting a film having a light reflecting property between them. FIGS. 5A and 5B show an example in which the light reflecting layer 4 is provided between the cladding 2 and the coating layer 3 by inserting a film having a light reflecting property between them. FIGS. 6A and 6B show an example in which the light reflecting layer 4 is provided on the outer periphery of the coating layer 3 by sticking a film having a light reflecting property to the outer periphery of the coating layer 3. The film is not specifically limited in shape, material and so on, but it is preferably a film which has a surface of a high reflectance and guides light in one direction.

In the side-face illuminating optical fiber formed with the provision of the light reflecting layer 4a to 4c as described above, when light transmitting through the core 1 is incident on the interface 1c at the portion where the light reflecting layer 4a to 4c is not provided, light is scattered by the uneven interface of the interface 1c, and part of the scattered light is radiated through the cladding 2 and the coating layer 3 outwardly of the outer periphery of the portion where the light reflecting layer 4a to 4c is not provided, thereby allowing the side face of the optical fiber to illuminate with light. On the other hand, as shown in FIGS. 4A and 4B, when light transmitting through the core 1 is incident on the light reflecting layer 4a, the light is reflected by the layer 4a as shown in FIG. 4A, and the light reflected by the light reflecting layer 4a is radiated from the outer periphery of the portion where the light reflecting layer 4a is not provided. In the optical fiber shown in FIGS. 5A and 5B, when light transmitted through the core 1 is incident on the interface 1c at the portion where the light reflecting layer 4b is provided, light is scattered by the uneven interface, and part of the scattered light passes through the cladding 2 and is reflected by the layer 4b. The light reflected by the layer 4b is radiated from the outer periphery of the portion where the layer 4b is not provided. Furthermore, in the optical fiber shown in FIGS. 6A and 6B, when light transmitting through the core 1 is incident on the interface 1c at the portion where the layer 4c is provided, the light is scattered by the uneven interface. Part of the scattered light passes through the cladding 2 and the coating layer 3 and is reflected by the layer 4c, and the light reflected by the layer 4c is radiated from the outer periphery of the portion where the layer 4 is not provided.

As described above, the light is not radiated from the side face that belongs to the side-face illuminating optical fiber and is provided with the light reflecting layer 4a to 4c, but radiated from the side face only of the portion where the light reflecting layer 4a to 4c is not provided. Therefore, light can be illuminated with high intensity of illumination in the specified direction.

Figure 7:
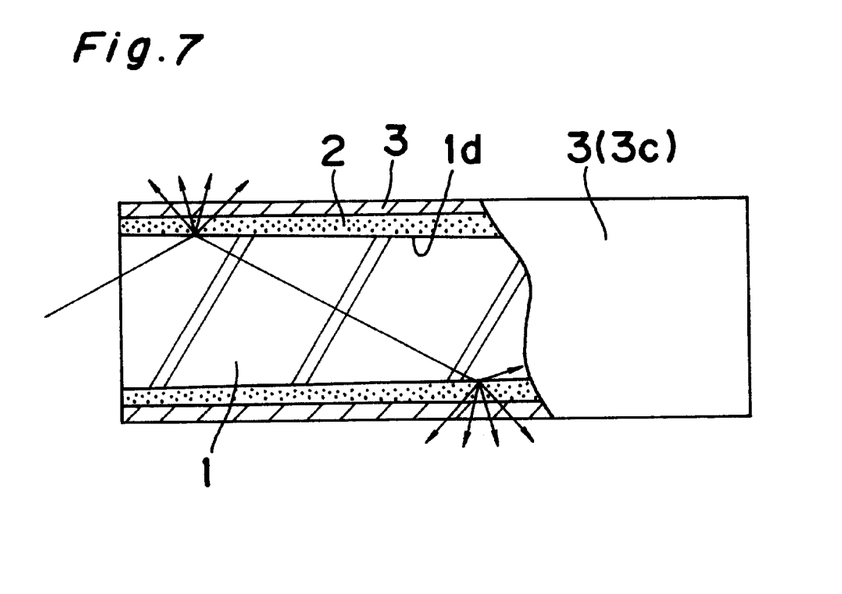
FIG. 7 is a front sectional view of an optical fiber of a fourth embodiment.

FIG. 7 shows an optical fiber of a fourth embodiment of the present invention. An optical fiber has a cladding made of silica aerogel which becomes thicker as a position along the longitudinal direction of the fiber becomes further away from the incident end of the optical fiber. The optical fiber also has a heat shrinkage tube 3c as the coating layer. Roughness of the unevenness is evaluated for example by height of peak to valley and number of peaks. According to the construction, height of peak to valley and number of peaks of the uneven interface, which is formed on the interface between core 1 and cladding 2, increase with increase in distance from the incident end of the optical fiber.

Specifically, a side-face illuminating optical fiber employing the heat shrinkage tube 3c as the coating layer 3 can be manufactured by arranging the heat shrinkage tube 3c on the outer periphery of the core 1, by inserting and filling pulverulent and/or granular silica aerogel in a gap between the core 1 and the heat shrinkage tube 3c and thereafter by shrinking the heat shrinkage tube 3a by applying heat thereto. In this case, an bore diameter of the heat shrinkage tube 3c become larger as a position along the longitudinal direction thereof becomes further away from the incident end of the optical fiber, so as for the inner surface of the tube 3c to have a reverse-taper structure. Therefore the thickness of the silica aerogel layer increases, as the position becomes further away from the incident end of the optical fiber. After filling up with silica aerogel, the cladding 2 is fixed on the core 1, by heating and shrinking the heat shrinkage tube 3c. Thus, thicker portion of the cladding 2 is pressed toward the core 1 at a larger pressure because the heat shrinkage tube 3c contracts. Therefore the height of peak to valley and number of peaks of the uneven interface increase with increasing distance from the incident end of the optical fiber.

The optical fiber has the uneven interface portion whose height of peak to valley and number of peaks of the uneven interface increases with increasing distance from the incident end of the optical fiber, and the light transmitting through the core 1 is incident on the interface 1d, and scattered by the uneven interface of the interface 1d. Scattered light is then radiated from outer periphery of the optical fiber. A quantity of light transmitted through the core 1 decreases as the position along the longitudinal direction becomes further away from the incident end of the optical fiber, but the roughness of the uneven interface increases and transmission ratio becomes higher as a position becomes further away from the incident end of the optical fiber. The transmission ratio is defined as a ratio of the quantity of light transmitted through the core 1 to the quantity of light radiated from outer periphery of the optical fiber. Further, the transmission ratio may be varied so as to provide uniform quantity of light injecting from outer periphery at each illuminating portion.

FIGS. 8A to 9B show an optical fiber of a fifth embodiment of the present invention. The optical fiber is provided with a fitting member 5a or 5b for pressing on the cladding 2. The members 5a and 5b have a predetermined longitudinal length and are made of a transparent material. The fitting member 5a or 5b is fitted to the cladding 2 by the application of a pressure so as to cover a part of the outer periphery of the cladding 2. In the construction describe above, a part of the cladding 2, which is covered by the fitting member 5a or 5b, presses the core 1 more tightly, and the uneven interface whose roughness is larger than that of the other portion is formed.

Figure 8A:
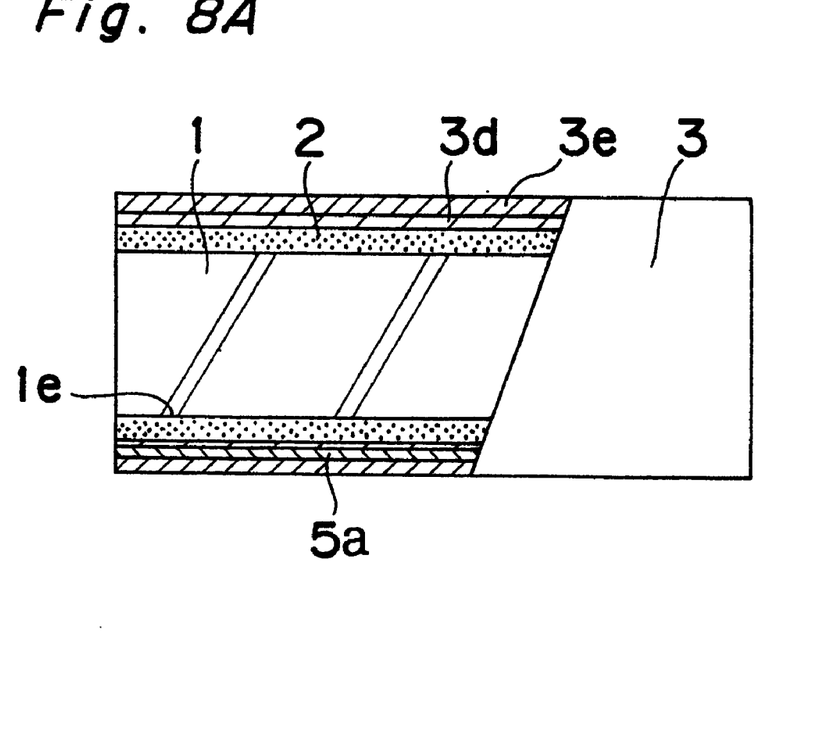
FIG. 8A is a front sectional view of an optical fiber of a fifth embodiment.
Figure 8B:
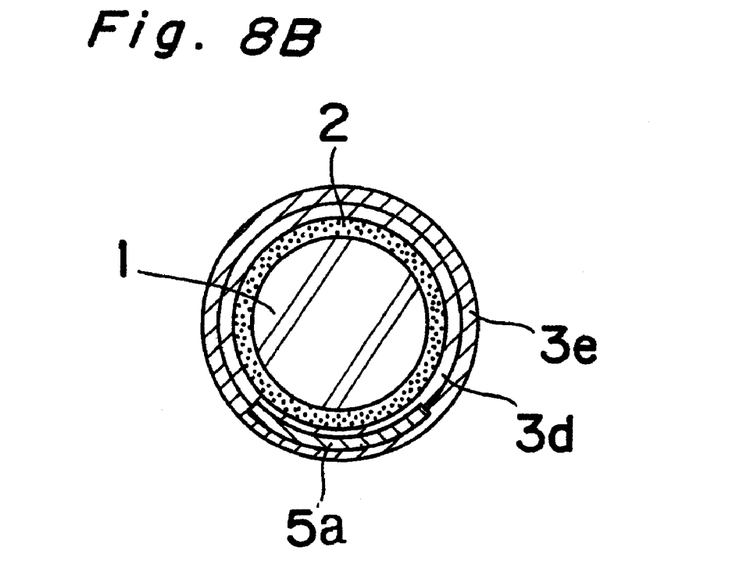
FIG. 8B is a side sectional view of the optical fiber of the fifth embodiment.

Specifically, as shown in FIGS. 8A and 8B, the fitting member 5a, which covers a part of periphery of the cladding 2 and elongates along a longitudinal axis of the optical fiber, is interposed between a first coating layer 3d and a second coating layer 3e. In this case, when the first coating layer 3d and the second coating layer 3e are thermally contracted, the part of the cladding 2, where the fitting member 5a is fitted, presses the core 1 more tightly because of interposing the fitting member 5a, then an uneven interface has a larger number of peaks and higher height of peak to valley.

Figure 9A:
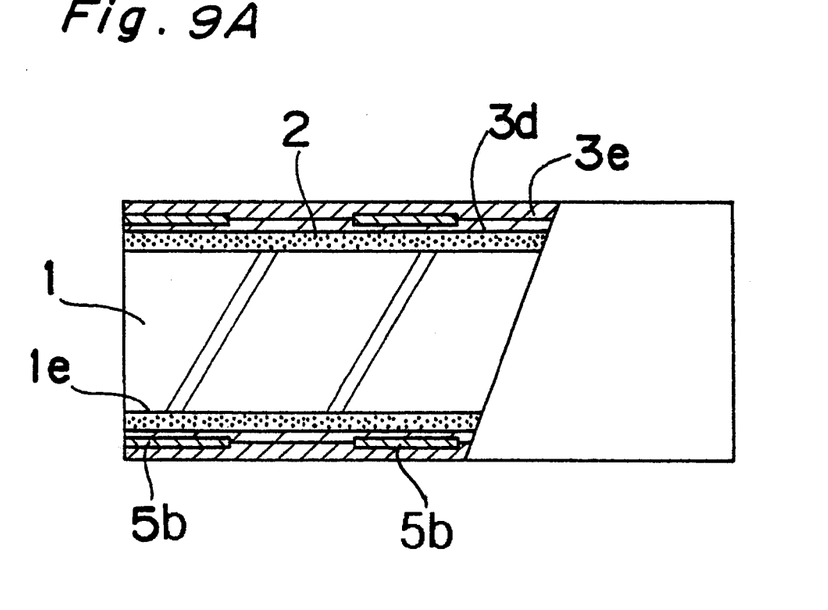
FIG. 9A is a front sectional view of another optical fiber of the fifth embodiment.
Figure 9B:
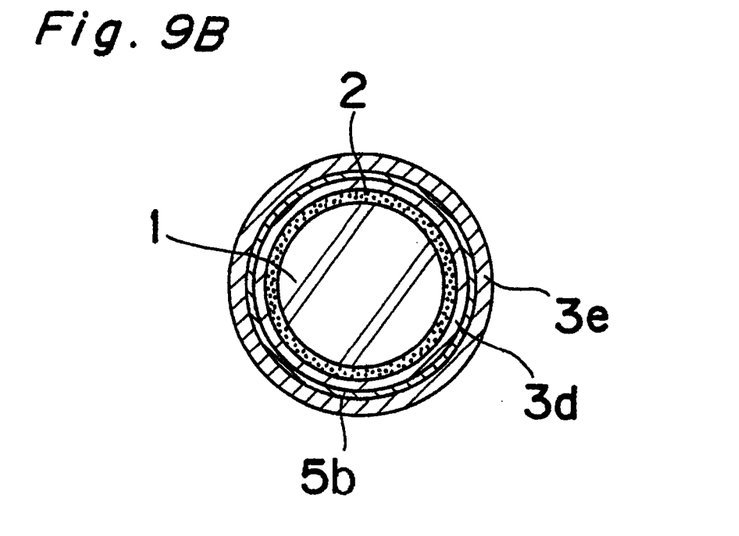
FIG. 9B is a side sectional view of the optical fiber of the fifth embodiment.

Further, in the optical fiber shown in FIGS. 9a and 9b, fitting members 5b are interposed between a first coating layer 3d and a second coating layer 3e. They cover whole periphery of the claddings 2 and have a predetermined longitudinal length so as to cover parts of the cladding 2 partially. When the first coating layer 3d and the second coating layer 3e are thermally contracted, the parts of the cladding 2, where the fitting members 5b are fitted, press whole periphery of the core 1 more tightly because the interposed fitting members 5b forms an uneven interface having a larger number of peaks and higher height of peak to valley.

Materials of the fitting member 5a or 5b and a condition thereof are not limited to this embodiment as far as it is transparent. Further, the inner surface of the fitting member may be a reflection plane. In this case, the light passing the core 1 and the cladding 2 at the uneven interface formed by the fitting member is reflected by the inner surface of the fitting member, thereby radiating from other outer periphery of the optical fiber. A shape of the fitting member is also not limited to this embodiment because the shape of the fitting member depends on a shape of the illuminating portion.

EXAMPLES

The present invention will be described in concrete below by way of examples.

First Example

Tetramethoxysilane oligomer ("Methyl Silicate 51" produced by COLCOAT CO., LTD, having an average molecular weight of about 470), water, ethanol and ammonia water of 25% were mixed at a molar ratio of 1:120:20:2.16 for the preparation of a sol solution. The solution was disposed at room temperature for the gelling, and a wet gel compound was obtained. Then, this gel compound was subjected to a hydrophobic process wherein it was crushed so as to have a particle diameter of 150 to 500 $\mu$m and thereafter stirred at 60° C. for about three hours in an ethanol solution of hexamethyldisilazane at a concentration of 0.6 mol/litter. Then, this gel compound that had undergone the hydrophobic process was disposed in carbon dioxide at 20° C. and 70 atm, and replacing the ethanol in the gel compound with carbon dioxide was performed for about two hours. Subsequently, granular hydrophobic silica aerogel was obtained by supercritical drying wherein the system was set for about one hour to the supercritical conditions of 80° C. and 160 atm of carbon dioxide.

On the other hand, an elastomer-based acryl material (refractive index: 1.49) having a circular cross-section of a diameter of 13 mm and a length of 2 m was provided as the core, and the core was inserted into a pipe-shaped fluorine-based heat shrinkage tube having a diameter of 15 mm, a length of 2 m and a thickness of 0.5 mm. Silica aerogel particles were filled in the gap between the core and the heat shrinkage tube, and thereafter the heat shrinkage tube was contracted by heating at 80° C. with a heating gun. Then, a side-face illuminating optical fiber as shown in FIGS. 2A and 2B was produced.

Second Example

A side-face illuminating optical fiber as shown in FIGS. 2A and 2B was produced similarly to the First Example except the heat shrinkage tube of a cylindrical ethylene-vinyl acetate copolymer (EVA resin) having a diameter of 15 mm, a length of 2 m and a thickness of 0.5 mm.

Third Example

A two-layer structure adhesive film was employed in which urethane-based hot-melt resin ("Elfan UH-203" having a thickness of 50 $\mu$m produced by NIHON MATAI CO., LTD.) was laminated on one surface of a tape which had a width of 30 mm and a thickness of 100 $\mu$m and was made of urethane resin. The silica aerogel particles obtained in the First Example was scattered to a thickness of 100 $\mu$m on the surface which belongs to the adhesive film and is laminated with the hot-melt resin, and this was thermally pressed under the conditions of 120° C. and 10 kg/cm$^2$, to stick the silica aerogel to the one surface of the tape. Then, the tape was spirally wound so that the silica aerogel was brought in contact with the outer periphery of the same core as that of the First Example. Thus a side-face illuminating optical fiber as shown in FIGS. 3A and 3B was produced.

Fourth Example

A light reflecting sheet ("Lumirer E60L" produced by TORAY INDUSTRIES, INC.) cut into a width of 20 mm and a length of 2 m is stuck to the outer periphery of the side-face illuminating optical fiber obtained in the Third Example with a transparent vinyl adhesive tape in parallel with the lengthwise direction of the side-face illuminating optical fiber. Thus, a side-face illuminating optical fiber as shown in FIGS. 6A and 6B having an illumination directivity was produced.

Fifth Example

Sodium silicate aqueous solution ("Silicate Soda No. J3" produced by NIPPON CHEMICAL INDUSTRIAL CO., LTD.) was mixed with water at a ratio by weight of 1:3 and thereafter the mixture was put through an ion-exchange resin ("IR-120B" produced by ORGANO CORP.) to obtain silica sol. The sol was disposed at room temperature for the gelling, and a wet gel compound was obtained. Then, this gel compound was subjected to a hydrophobic process wherein it is crushed to have a particle diameter smaller than 150 $\mu$m and thereafter stirred at 40° C. about six hours in an isopropanol solution of dimethyldimethoxysilane at a concentration of 1.2 mol/litter. Then, this gel compound that had undergone the hydrophobic process was disposed in carbon dioxide at 20° C. and 70 atm, and an operation of replacing the ethanol in the gel compound with carbon dioxide was performed for two hours. Subsequently, a granular hydrophobic silica aerogel was obtained by performing supercritical drying for two hours wherein the system was set to the supercritical conditions of 40° C. and 80 atm of carbon dioxide. By using the silica aerogel particles, a side-face illuminating optical fiber as shown in FIGS. 2A and 2B was obtained similar to the First Example.

Sixth Example

For the heat shrinkage tube as the coating layer, a generally pipe shaped fluoro heat shrinkage tube was used, having a diameter of 15 mm, a length of 4 m (obtained by connecting two heat shrinkage tubes having a length of 2 m) and a thickness of 0.5 mm. The heat shrinkage tube had been formed into a pipe with reverse-taper by inserting a 4 m long metal stick, whose diameter varies from $\phi$13.5 mm to $\phi$15 mm smoothly, and by heating up to 80° C. with a heating gun. An acrylic elastomer core of $\phi$13 mm and 4 m long was inserted into the heat shrinkage tube, then a gap between the heat shrinkage tube and the core was filled up with the silica aerogel particles. Then the heat shrinkage tube was heated up to 80° C. with a heating gun and the heat shrinkage tube was contracted. Thus a side-face illuminating optical fiber as shown in FIG. 7 was produced.

Seventh Example

The core similar to the First Example was inserted into a flexible polyethylene tube as the first coating layer having a diameter of 15 mm, a length of 2 m and thickness of 0.5 mm. A gap between the core and the flexible polyethylene tube was filled up with the silica aerogel obtained in the First Example. Then a polyethylene sheet as a fitting member having a width of 5.0 mm and thickness of 2.0 mm was stuck to an outer periphery of the flexible polyethylene tube so as to extend in a parallel direction with longitudinal direction of the flexible polyethylene tube. The flexible polyethylene tube with polyethylene sheet is inserted into a generally pipe shaped fluoro heat shrinkage tube as the second coating layer having a diameter of 18 mm, a length of 2 m and thickness of 0.5 mm. Then the heat shrinkage tube was heated up to 80° C. with a heating gun and the heat shrinkage tube was thermally contracted. Then the uneven interface was formed on the interface between the core and the cladding by pressing the core at a position where the polyethylene sheet was fitted. Thus, the optical fiber was produced whose quantity of light increases at a position where the polyethylene sheet was fitted.

Eighth Example

The core similar to the first example is inserted into a flexible polyethylene tube as the first coating layer having a diameter of 15 mm, a length of 2 m and a thickness of 0.5 mm. A gap between the core and the flexible polyethylene tube was filled up with the silica aerogel obtained in the First Example. Next, the first coating layer was inserted into six of flexible polyethylene tubes as fitting members having a length of 200 mm and a thickness of 2.0 mm, and six fitting members were disposed with 30 cm interval from the origin, which was 20 cm away from the incident end of the optical fiber. Next, the first coating layer with the fitting members was inserted into a generally pipe shaped fluoro heat shrinkage tube having a diameter of 20 mm, a length of 2 m and a thickness of 0.5 mm. Then the heat shrinkage tube is heated up to 80° C. by the heating gun and the heat shrinkage tube was contracted. Thus, the optical fiber was produced whose quantity of light increases at a position where the polyethylene tube was fitted.

First Comparative Example

An optical fiber was produced to have a core of an elastomer-based acryl material (refractive index: 1.49) having a diameter of 13 mm and a length of 2 m identical to that of the First Example and a cladding of a transparent fluororesin (refractive index: 1.4, thickness: 0.5 mm).

Second Comparative Example

An optical fiber of Second Comparative Example was produced similar to the First Example except for the heat shrinkage tube having a length of 4 m and the core having a length 4 m.

The side-face illuminating optical fibers obtained in the aforementioned First through Fifth Examples, Seventh and Eighth Examples and the First Comparative Example were arranged horizontally at a height of 20 cm above the floor surface. Light was entered from one end of the optical fibers with a metal halide illuminating apparatus ("LS-M160" produced by SUMITA OPTICAL GLASS CO., LTD.) used as a light source. The illuminance was measured by illuminometers placed on the floor surface at intervals of 30 cm from this light source. The side-face illuminating optical fibers obtained in the aforementioned Sixth Example and the Second Comparative Example were arranged horizontally at a height of 20 cm above the floor surface. Light was made to enter from one end of the optical fibers with a metal halide illuminating apparatus ("LS-M160" produced by SUMITA OPTICAL GLASS CO., LTD.) used as a light source. The illuminance was measured by illuminometers placed on the floor surface at intervals of 50 cm from this light source. It is to be noted that the Fourth Example was arranged so that the portion to which the light reflecting sheet was stuck faced upward. Further, Seventh and Eighth Examples were arranged so that the portion, where the fitting members was interposed, faces to illuminometers. The measurement results are shown in Tables 1 and 2.

TABLE 2

|  | Example 8 | Comparative Example 2 |
| --- | --- | --- |
| 50 cm | 370 | 430 |
| 100 cm | 380 | 410 |
| 150 cm | 380 | 420 |
| 200 cm | 390 | 370 |
| 250 cm | 360 | 350 |
| 300 cm | 400 | 310 |
| 380 cm | 380 | 290 |

As is evident in Table 1, it is confirmed that First through Fifth Examples have a high illuminance at the side face and the illuminance of light radiated from the side face is not reduced even apart from the incident end. It is confirmed that Seventh and Eighth Examples have higher illuminance at the side face. As is evident in Table 2, in the Sixth Example, it is confirmed that the illuminance of light radiated from the side face is not reduced even apart from the incident end.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A side-face illuminating optical fiber comprising:
   a core transmitting therethrough light entering from an incident end of said optical fiber;
   a silica aerogel cladding which covers an outer peripheral surface of said core;
   a transparent coating layer which covers an outer periphery of said cladding; and
   an illuminating portion comprising at least a part of an interface between said core and said cladding, wherein said light transmitted through said core radiates through said illuminating portion to said cladding.

2. The side-face illuminating optical fiber as defined in claim 1 wherein said illuminating portion comprises an uneven interface that scatters said light transmitted through said core.

3. The side-face illuminating optical fiber according to claim 2, wherein said uneven interface comprises particles of said cladding pressed against said core.

4. The side-face illuminating optical fiber as defined in claim 2 wherein said cladding consists of particles, and said coating layer is a layer, which presses, said cladding against said core.

TABLE 1

|  | Example 1 | Example 2 | Example 3 | Example 4 | Example 5 | Example 6 | Example 7 | Comparative Example 1 |
| --- | --- | --- | --- | --- | --- | --- | --- | --- |
| 30 cm | 440 | 400 | 390 | 580 | 380 | 570 | 530 | 300 |
| 60 cm | 430 | 420 | 380 | 540 | 390 | 600 | 520 | 80 |
| 90 cm | 430 | 400 | 360 | 560 | 400 | 590 | 520 | 60 |
| 120 cm | 400 | 400 | 340 | 550 | 390 | 590 | 550 | 50 |
| 150 cm | 420 | 410 | 420 | 570 | 380 | 560 | 510 | 40 |
| 180 cm | 400 | 390 | 380 | 570 | 420 | 570 | 500 | 30 |

5. The side-face illuminating optical fiber as defined in claim 4 wherein said coating layer is a heat shrinkage tube which presses said cladding towards said core by thermal contraction.

6. The side-face illuminating optical fiber according to claim 4, wherein said coating layer comprises a tape having one surface to which said silica aerogel is adhered, and said tape being wound about an outer periphery of said core, wherein said surface to which said silica aerogel is adhered contacts the core.

7. The side-face illuminating optical fiber as defined in claim 1 wherein a layer which reflects light is provided one of between said core and said cladding, between said cladding and said coating layer and on an outer periphery of said coating layer so as to shield said light radiating through said illuminating portion.

8. The side-face illuminating optical fiber according to claim 7, said layer which reflects light extending along a longitudinal length of said core and covering a portion of an outer periphery of said core.

9. The side-face illuminating optical fiber as defined in claim 1 wherein the silica aerogel is obtained by making a gel of a solution containing silicate ester hydrophobic and by subjecting said obtained hydrophobic gel to a supercritical drying process.

10. The side-face illuminating optical fiber as defined in claim 1 wherein said optical fiber has at least two said illuminating portions, and said illuminating portions are spaced along a direction of a longitudinal axis of said optical fiber.

11. The side-face illuminating optical fiber according to claim 10, wherein a transmission radio of the optical fiber at a position of said illuminating portion increases with an increase in distance from said incident end.

12. The side-face illuminating optical fiber as defined in claim 11 wherein said each transmission ratio varies with said position so as to provide uniform quantity of light in said illuminating portion.

13. The side-face illuminating optical fiber as defined in claim 1 wherein said illuminating portion is elongated in a direction of a longitudinal axis of said optical fiber.

14. The side-face illuminating optical fiber according to claim 13, wherein a transmission ratio of the optical fiber at a position of said illuminating portion increases with an increase in distance from said incident end.

15. The side-face illuminating optical fiber as defined in claim 14 wherein said each transmission ratio varies with said position so as to provide uniform quantity of light in said illuminating portion.

16. The side-face illuminating optical fiber according to claim 1, said illuminating portion comprising an uneven interface with a distance between peak to valley and a number of peaks increases with an increase in distance from the incident end.

17. The side-face illuminating optical fiber according to claim 1, further comprising at least one fitting member covering a portion of said cladding and extending along a longitudinal axis of said optical fiber.

18. The side-face illuminating optical fiber according to claim 17, said fitting member comprising a transparent member.

19. The side-face illuminating optical fiber according to claim 17, an inner surface of said fitting member comprising a reflective surface.

20. The side-face illuminating optical fiber according to claim 17, said coating layer comprising first and second coating layers with said fitting member interposed between said first and second coating layers.

* * * * *

UNITED STATES PATENT AND TRADEMARK OFFICE
CERTIFICATE OF CORRECTION

PATENT NO. : 6,154,595
DATED : November 28, 2000
INVENTOR(S) : H. Yokogawa et al.

It is certified that error appears in the above-identified patent and that said Letters Patent is hereby corrected as shown below:

Column 13,
Line 32, "radio" should be -- ratio --.

Signed and Sealed this

Twenty-fifth Day of December, 2001

Attest:

JAMES E. ROGAN
Attesting Officer   Director of the United States Patent and Trademark Office